United States Patent
Garcia Salvadores

(10) Patent No.: US 11,205,286 B2
(45) Date of Patent: Dec. 21, 2021

(54) TECHNIQUES FOR OPTIMIZING CREATION OF DIGITAL DIAGRAMS

(71) Applicant: MICROSOFT TECHNOLOGY LICENSING, LLC, Redmond, WA (US)

(72) Inventor: Arcadio Garcia Salvadores, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 11 days.

(21) Appl. No.: 16/576,552

(22) Filed: Sep. 19, 2019

(65) Prior Publication Data

US 2021/0019925 A1    Jan. 21, 2021

Related U.S. Application Data

(60) Provisional application No. 62/874,790, filed on Jul. 16, 2019.

(51) Int. Cl.
| | |
|---|---|
| *G06T 11/20* | (2006.01) |
| *G06F 3/0484* | (2013.01) |
| *G06T 3/00* | (2006.01) |
| *G06T 11/60* | (2006.01) |

(52) U.S. Cl.
CPC ........ *G06T 11/203* (2013.01); *G06F 3/04845* (2013.01); *G06T 3/0006* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 6,789,109 | B2 | 9/2004 | Samra et al. |
| 7,454,702 | B2 | 11/2008 | Simmons et al. |
| 7,890,890 | B2 | 2/2011 | Jarrett et al. |
| 8,334,869 | B1 | 12/2012 | Padmakar et al. |
| 8,345,056 | B2 | 1/2013 | Perani et al. |

(Continued)

OTHER PUBLICATIONS

Gamet, "New Touch Workspace for Adobe Illustrator". Sep. 14, 2015 (Year: 2015).*

(Continued)

*Primary Examiner* — Yanna Wu

(57) ABSTRACT

A method and system for providing optimized digital drawings are provided. The method and system include receiving a request to perform a transformation operation on a digital drawing to optimize the digital drawing, providing a tool for selecting an area of the digital drawing to perform the transformation operation on, receiving a selection of the selected area of the digital drawing, transforming the selected area of the digital drawing to optimize the digital drawing, and displaying the transformed area of the digital drawing. The method may also include receiving an input for a digital drawing, identifying the input as related to coloring a portion of the digital drawing, identifying one or more boundary lines for the portion of the digital drawing, determining if the input includes a stroke that extends outside the one or more boundary lines, and removing a section of the stroke that extends outside the boundary lines.

8 Claims, 10 Drawing Sheets

(56) References Cited

U.S. PATENT DOCUMENTS

| | | | |
|---|---|---|---|
| 8,620,084 | B2 | 12/2013 | Kolmykov-Zotov et al. |
| 2008/0036771 | A1 | 2/2008 | Bae |
| 2012/0210349 | A1 | 8/2012 | Campana et al. |
| 2013/0127836 | A1* | 5/2013 | Joshi ............... G06T 17/20 345/419 |
| 2016/0162603 | A1* | 6/2016 | Schriesheim ........... G06F 30/00 703/1 |
| 2017/0206861 | A1 | 7/2017 | Rojas |
| 2017/0357426 | A1* | 12/2017 | Wilson ................ G06F 3/016 |
| 2018/0335932 | A1 | 11/2018 | Ta |
| 2019/0272417 | A1* | 9/2019 | Reihl ................ G06F 40/106 |

OTHER PUBLICATIONS

Gamet Erica, "New Touch Workspace for Adobe Illustrator", Retrieved From: http://creativepro.com/new-touch-workspace-for-adobe-illustrator/, Oct. 10, 2014, 4 Pages.

Gabriel, Kristian, "Smooth Moves In Adobe Illustrator", Retrieved From: https://web.archive.org/web/20181 119043129/https://www.trainingconnection.com/illustrator/lessons/smooth-curves.php, Nov. 19, 2018, 5 Pages.

"International Search Report and Written Opinion Issued in PCT Application No. PCT/US20/033506", dated Sep. 30, 2020, 19 Pages.

Sawh, Kishore, "Photoshop Tip | Split Your Screen For One Image To Maximize Efficiency", Retrieved From: https://web.archive.org/web/20170713052543/https://www.slrlounge.com/photoshop-tips-split-sceen-dual-window-efficiency/, Jan. 5, 2016, 9 Pages.

Application as Filed in U.S. Appl. No. 16/129,266, filed Sep. 12, 2018, 40 Pages.

\* cited by examiner

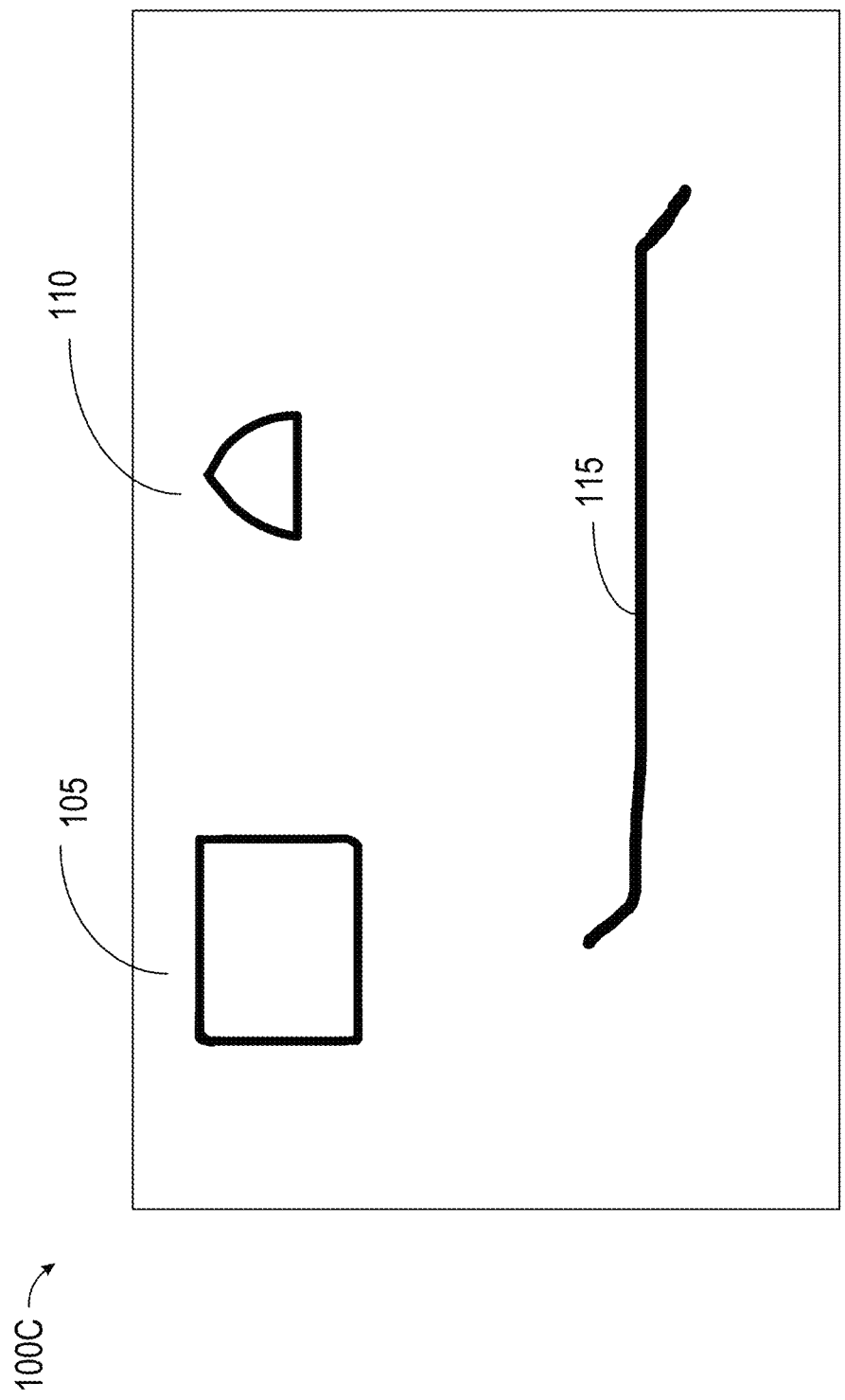

TECHNIQUES FOR OPTIMIZING CREATION OF DIGITAL DIAGRAMS

CROSS-REFERENCE TO A RELATED APPLICATION

This patent application claims the benefit of priority to U.S. Provisional Application No. 62/874,790 entitled "Techniques For Optimizing Creation Of Digital Diagrams," filed on July 16, 2019, the entirety of which is incorporated herein by reference.

TECHNICAL FIELD

This disclosure relates generally to techniques for optimizing the process of creating digital diagrams and, more particularly, to customizing the process of creating a digital drawing by providing a customizable lasso tool and by enabling collaborative use of multiple devices in creating a digital drawing.

BACKGROUND

Current techniques provided for creating digital diagrams often force the user to choose between an experience that resembles the analog process of drawing on a physical object (e.g., drawing on canvas, paper, etc.) or one that is very detached from the natural process of drawing. For example, most current techniques do not address the difficulty often encountered with making precise digital strokes. Moreover, digitally coloring a drawing in a precise manner is often time-consuming and challenging. This often means that coloring can either be done fast or accurately. Because of these technical problems, the user is often required to clean up the drawing later which adds to the amount of time required to finish a project. In short, drawing precise digital diagrams with the currently provided tools is time-consuming and difficult.

Hence, there is a need for an improved method and system for creating a digital drawing.

SUMMARY

In one general aspect, the instant disclosure presents a device having a processor and a memory in communication with the processor wherein the memory stores executable instructions that, when executed by the processor, cause the device to perform multiple functions. The function may include receiving a request to perform a transformation operation on a digital drawing to optimize the digital drawing, providing a tool for selecting an area of the digital drawing to perform the transformation operation on, receiving a selection of the selected area of the digital drawing, transforming the selected area of the digital drawing to optimize the digital drawing, and displaying the transformed area of the digital drawing.

In one general aspect, the instant disclosure presents a device having a processor and a memory in communication with the processor wherein the memory stores executable instructions that, when executed by the processor, cause the device to perform multiple functions. The function may include displaying a first user interface of a first instance of a digital drawing application, receiving a request for launching a second instance of the digital drawing application in a second device, communicating with the second device to launch the second instance in the second device, enabling the second device to display a second user interface in the second instance that corresponds with the first user interface, receiving an input from the second instance in the second device, processing the input in the first instance.

In yet another general aspect, the instant application describes a method for providing optimized coloring for a digital drawing. The method may include receiving an input for a digital drawing, identifying the input as related to coloring a portion of the digital drawing, identifying one or more boundary lines for the portion of the digital drawing, determining if the input includes a stroke that extends outside at least one of the one or more boundary lines, and upon determining that the input includes the stroke that extends outside the at least one of the one or more boundary lines, removing a section of the stroke that extends outside the at least one of the one or more boundary lines.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 1A-1C depict example graphical user interface screens of an application providing tools for creating digital drawings.

DETAILED DESCRIPTION

Figure 1A:
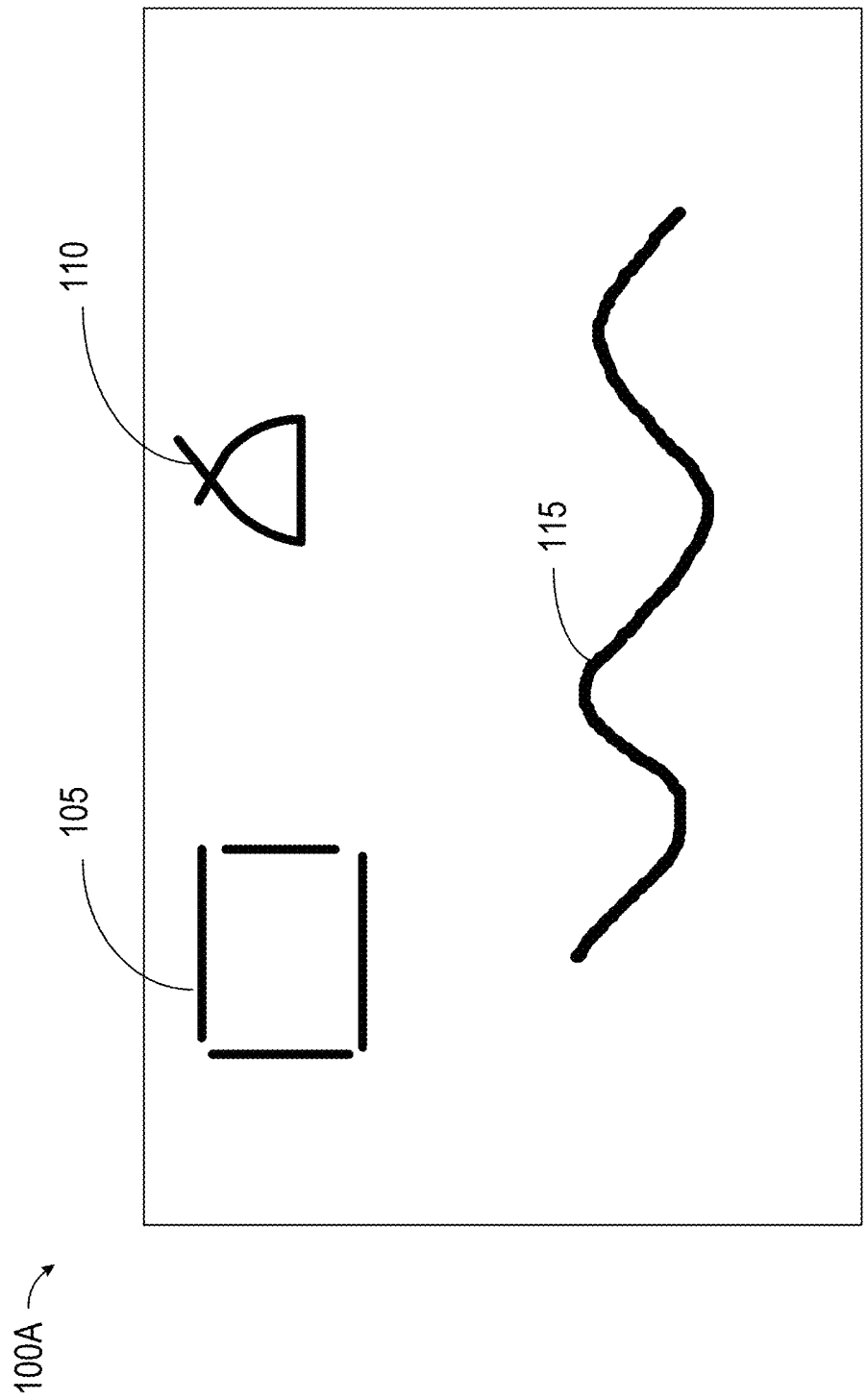

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Most current applications provided for creating digital drawings either resemble the analog process of drawing on a physical object (e.g., canvas, paper, etc.) or provide an experience that is very different from the natural process of drawing. For example, most current techniques do not provide a technical solution for the difficulty often encountered with making precise strokes. When using a mouse, digital pen or another object to draw or color digitally, it is often difficult to make the ends of different strokes meet in the same point (e.g., there are instances when the lines do not meet, or lines extend beyond the point of intersection). Furthermore, coloring a drawing in a precise manner can be considered one of the most mechanical and time-consuming parts of creating digital diagrams. It is a repetitive process that often requires accuracy since it has to be done within a certain boundary. This often means that coloring can either be done fast or accurately. Because of these technical problems, the user is often required to clean up the drawing later, which adds to the amount of time required to finish a project. In short, drawing precise objects with the currently provided digital tools requires a steady hand, skill and time.

To address these technical problems, some existing applications offer smoothing algorithms that can smooth lines as they are being drawn. This often introduces some lag between when a line is created and when it is displayed, which can cause an unpleasant user experience. Furthermore, the automatic smoothing of lines does not allow the user to select how and where a line should be modified. Other existing programs offer the option to edit lines manually by, for example, dragging and moving different anchor points of each stroke. This often requires precise user input and therefore functioning more accurately with input devices such as a mouse. To address existing problems with coloring, some existing programs incorporate paint bucket tools that use a floor fill algorithm to fill areas with a certain color. However, these tools were invented to be used with a mouse and often do not feel natural for digital pen users. Moreover, they do not provide an option for partially filling an area.

Another technical problem encountered while creating digital drawings is the shortage of space available for displaying the piece of drawing being created and the tools and options offered for modifying the drawing on the same screen. To address this, certain solutions have been offered that provide a dedicated hardware device (e.g., Surface Dial) for displaying and controlling menu options. However, acquiring a separate device is costly. Furthermore, these devices often work with a restrictive group of computer devices.

One addition technical problem a user may face is the difficulty encountered in correctly drawing the relative sizes of different elements. This is often encountered by students or other users who are not sufficiently experienced and can result in a frustrating experience for them, which may prevent them from learning faster.

To address these technical and practical problems and more, in an example, this description provides a technical solution of providing an application that (i) offers customized transformation of a selected area, (ii) provides coordinated side by side displaying of multiple user interfaces, (iii) provides optimized coloring, and (iv) enables concurrent and coordinated execution of multiple instances of the application on a plurality of devices.

The customized transformations offered by the technical solution may include joining strokes, trimming strokes, straightening strokes and smoothing strokes. Joining strokes may involve locating stroke endpoints contained in a selected area and joining them. Trimming strokes, on the other hand, may include first identifying strokes that intersect in the selected area, and second if one of them includes an endpoint that goes beyond the intersection point, trimming that stroke such that the new endpoint is placed in the intersection between the strokes. In an example, straightening strokes may involve straightening all the stroke segments contained in the selected area by removing all intermediate points between the two strokes that intersect with the selected area. This may allow the user to selectively straighten portions of a stroke and straighten multiple strokes at the same time. Smoothing strokes may include smoothing the stroke segments contained in the selected area by either approximating the segments to the closest Bezier curve, creating an interpolating spline, or using a moving average algorithm. In one implementation, an all-purpose tool could be provided that, depending on the strokes contained in the selected area, may use internal logic or a trained machine learning (ML) model to predict which of the above-mentioned customized transformations (joining strokes, trimming strokes, straightening strokes and smoothing strokes) should be used on a selected area.

Providing coordinated side by side displaying of multiple user interfaces may include displaying two user interface (UI) screens side by side. In one implementation, each of the UIs may contain a user control that can be zoomed, panned and/or rotated. One UI screen may contain the reference image, and the other UI screen may contain a canvas where the user can create their drawing. To provide a coordinated experience, upon receiving user interaction with one UI screen (e.g., zoom level, offset, rotation), the application may apply the same interaction (e.g., same transformation) to the other UI screen.

In one implementation, providing optimized coloring may include capturing a stroke before it is rendered, determining whether the stroke being drawn intersects with any existing strokes in the upper layers of the drawing (which may contain the linear art for the drawing), and if any intersection is identified, trimming the stroke being drawn so that it does not leave the bounds of the current area, before rendering the stroke.

Enabling concurrent and coordinated execution of multiple instances of the application on a plurality of devices may involve providing an option for launching an additional remote instance of the application from another device. In an example, this may involve locating nearby devices, displaying a list of identified devices, and upon receiving selection of one, launching the application in the selected remote device. In an example, once the application is launched in the selected device, the additional instance can be used to provide input to the main application. In this manner, the second instance can be used to display and operate menu options, while the main instance only displays the drawing.

As will be understood by persons of skill in the art upon reading this disclosure, benefits and advantages provided by such implementations can include, but are not limited to, increased efficiency and quality and providing an overall improved user experience.

Referring now to the drawings, FIG. 1A shows an example graphical user interface (GUI) screen 100A of an application providing tools for creating digital drawings. The UI screen 100A displays multiple drawing elements 105, 110 and 115, each of which may be in need of refinement. For example, drawing element 105 includes a plurality of unconnected lines, while drawing element 110 includes lines that extend beyond a point of intersection between the two lines. The drawing element 115, on the other hand, includes multiple ridges and grooves. While a drawing element could include intentional ridges and grooves, the ridges of grooves of drawing element 115 are undesired and may have been caused by the user's unsteady hand and/or other technical problems associated with the digital pen or mouse. To provide a technical solution to address these technical problems, in one implementation, the application providing tools for creating digital drawings may include a customizable lasso tool.

Figure 1B:
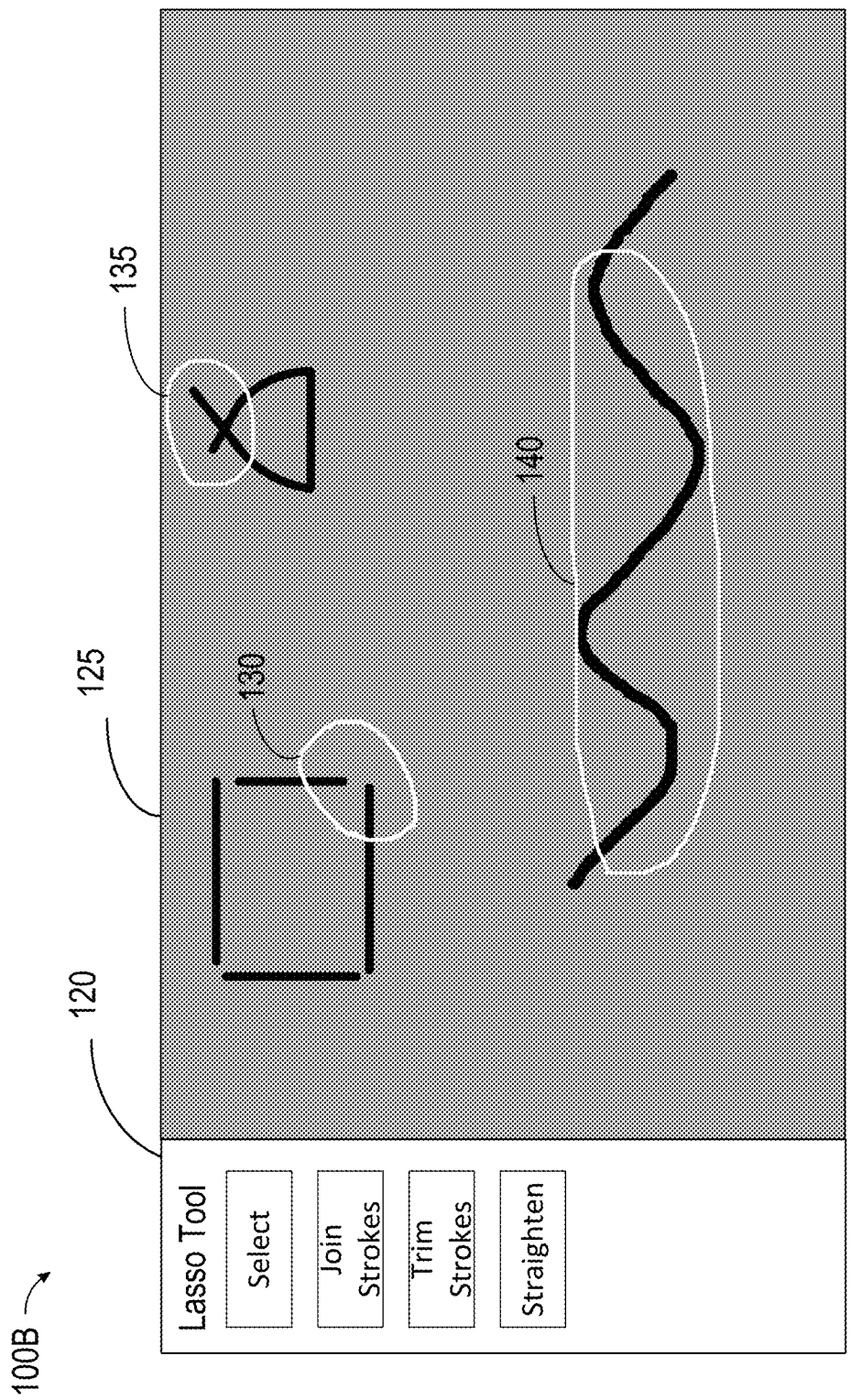

FIG. 1B shows an example GUI screen 100B of an application providing a lasso tool that offers customized transformations for a selected area. As is known in the art, a lasso tool may be an editing tool available in digital image editing and/or digital software programs. As shown in GUI screen 100B, the lasso tool may be provided as a menu option upon selection of which an expanded menu providing various options for transforming a selected area may be provided. In order to allow the user to choose the location and type of transformation desired, the lasso tool may include a select menu option 120 upon choosing of which, the contents pane 125 of the GUI screen 100B may be darkened to indicate the area is selectable. The contents pane 125 may refer to the portion of the GUI screen 100B which displays the drawing and can be modified to create digital drawings. Once the content pane 125 is darkened, the user may be able to use an input device (e.g., digital pen, mouse, fingers, etc.) to select an area of the content pane 125 to which transformations should be applied. For example, as shown in the GUI screen 100B, the user may select the area 130. In one implementation, this may be performed via a drag and drop operation.

Once an area such as area 130 is selected, the user may select from the menu options provided to invoke transformations to the selected area. In one implementation, the options provided include join strokes, trim strokes and straighten strokes. In an example, by selecting the area 130 and choosing the menu option for join strokes, the two endpoints shown in the selected area 130 would be automatically joined. This may be done by examining the vector information available from the drawing to identify stroke endpoints in the selected area, and then drawing a straight line from the identified endpoints to join them. In one implementation, this involves calculating the average of the position of the identified endpoints and moving all the endpoints to those coordinates. Utilizing this may allow the user fine grained control over the join operation in a precise manner. For example, by including a longer or shorter portion of the endpoint in the selected area, the user can specify the weight of each point for calculating the averaged position and/or how much should every stroke be smoothed towards the new endpoint.

In addition to the selected area 130, other areas of the contents pane may be selected for conducting optimizing transformations. For example, each of the areas 135 and 140 may be selected to perform trimming and straightening operations, respectively. In one implementation, all of the areas 130, 135 and 140 can be selected at the same time and each of the join, trim and straightening operations may be performed on the portion of the selected area that corresponds to the operation.

FIG. 1C depicts an example GUI screen 100C in which all three drawing elements 105, 110 and 115 have been transformed using the available transformation tools (e.g., join strokes, trim strokes and straighten strokes). For example, drawing element 105 has been transformed by properly joining all four unconnected corners. To join unconnected strokes, the application may first identify unconnected endpoints of all strokes in the selected area. The program may determine that each two or more unconnected endpoints that are within a certain distance should be connected. To determine how to draw the lines that connect them, the application may calculate the middle point between the unconnected endpoints and use that as a reference point for drawing lines that connect the strokes. Then, the application may identify points of intersection between the selected area and the unconnected strokes and draw a line from each point of intersection to the reference point.

The drawing element 110 of FIG. 1C has been transformed by utilizing the trim strokes option to trim the endpoints that extended beyond the point of intersection. To achieve this, the application may identify two or more vector strokes that have intersected but include strokes that go beyond the point of intersection. It may then determine if any of the strokes that go beyond the point of intersection have endpoints that are located within the selected area. If they do, then the application may remove the part of each stroke that goes from the point of intersection to the identified endpoint.

The drawing element 115 has also been transformed by smoothing the ridges and grooves via the straighten strokes menu option. This may be achieved by first identifying the points where the drawing lines (vector strokes that make up the lines in the selected area) intersect with the selected area. If the selected area of the drawing also includes intersections between multiple strokes, then the points of intersection are also identified as end points for drawing a straight line from one endpoint to another. Once the points of intersection are identified, a straight line may be drawn from one point to the other. Thus, by utilizing the transformation tools (e.g., join strokes, trim strokes and straighten strokes) available, imperfections in a digital drawing can be quickly and efficiently addressed, thus providing a solution for the technical problems encountered by digital artist.

The menu options provided in the GUI screens 100A-100B of FIGS. 1A-1B may need to be utilized one by one. In other words, utilizing the select option, a user may first select an area and choose one of the provided transformation options to transform an area. This means that if an area requires multiple transformations, each transformation option may need to be selected one by one. In an alternative implementation, the application may automatically determine what transformations are needed for a selected area. For example, if the selected area includes a corner where two lines do not completely meet and another corner where lines extend beyond a point of intersection, the application may automatically determine that the unconnected lines should be joined and the intersected lines should be trimmed. This may be achieved by utilizing an ML model trained on a dataset of example digital drawings.

Figure 2A:
FIGS. 2A-2B depict example graphical user interface screens displaying side by side screens in an application providing tools for creating digital drawings.

FIG. 2A depicts an example GUI screen 200A displaying side by side screens 210 and 220 for easy reference. In an implementation, the screen 210 may be a reference drawing utilized by the user to create a drawing on the screen 220. In such cases, the side by side view enables the user to easily and efficiently use the reference drawing to create a piece of digital drawing. This may be particularly useful to users who are students or are otherwise learning how to create digital drawings.

Although the screens 210 and 220 are shown as being part of the same GUI screen 200, in one implementation, the two screens may form different GUI screens. For example, the screens may be hosted in two different windows. In such a configuration, information about the state of one window may be propagated between the different threads using marshalling or other similar techniques. In a configuration where the two windows belong to different applications, a channel of communication may be utilized to communicate between the applications. Examples of such channels include network sockets, uniform resource identifier (URI) activation or an operating system (OS) contract. As is known in the art, OS contracts may allow applications to advertise that they implement certain functionality and make those functionalities available to other applications. As is applied here, applications that implement a potential reference view contract, can be combined to host one view each without needing to know details about the implementation of the other applications. In an example, each screen 210 or 220 may be movable by the user, such that for example the user can switch the place of the two screens. Other configurations are also possible.

Irrespective of the location of each side by side screen, in one implementation, the screens may be configured such that changes such as zooming, panning or scrolling in the image in one screen would automatically result in a corresponding action in the other screen. For example, each screen may include user controls for zooming, panning, scrolling and/or rotating the screen. Invoking the user control to perform any such operation may automatically apply the same transformation (zoom level, offset, rotation) in the other screen.

In one implementation, the application may control how the screens are visually arranged, for example using regular UI application programming interfaces (APIs) if they are in the same window, or OS window placement APIs if they are different windows. In an example, whether the screens are placed side by side horizontally or vertically may depend on the screen size ratio and orientation of the two screens. For example, the screens may be placed in the direction of the longer axis to make the screens as square as possible, since a wide aspect ratio is not optimal for drawing. When placed side by side horizontally, the application may use OS APIs to determine whether the user is left or right handed, and place the screen with the canvas (e.g., the screen for creating digital drawing) on the side of the dominant hand, such that the user does not occlude the reference while drawing. When drawn side by side vertically, the screen with the canvas may be placed in the bottom view, to avoid occluding the reference with the user's arm and/o because that is the view that may potentially be in a physically horizontal surface in multiscreen and/or foldable devices.

In an implementation, when the screens are located in different windows, the screens may have different sizes. In an example, whether the screens can have different sizes may depend on whether the OS windowing logic allows the option. In such a configuration, the application may scale the content proportionally to each window size, so that objects of the same size occupy the same area of the view. Alternatively, the application may keep the content the same logical size or same physical size, such that they have the same physical dimensions for the user. Each of these configurations have their advantages. Scaling the content may be desirable when the two screens have different sizes and are physically distant (e.g. a TV and a tablet), while maintaining the same logical and physical size may be advantageous when the two screens are of similar size and are physically close to each other (e.g. the same display device, a foldable device, a device with multiple screens, or a digitizer screen placed next to a regular one).

The above-discussed configurations for displaying side by side screens may apply when the application is running on a single device with one or multiple screens or when the two screens are running on separate computing devices. In a configuration where the screens are displayed on two separate computing devices, the two applications (which could be instances of the same application or different applications) may communicate over a network protocol, use an OS API (e.g., Microsoft Rome API) or another wireless communication protocol such as Bluetooth to communicate. As discussed in further details below, the primary ink-enabled device may remotely launch the application in the second device, making any computing device (e.g. portable devices such as phones, tablets) suitable for use as a reference screen even when such a device has limited screen space, since any nearby device (e.g., a PC, laptop, TV screen, Surface hub, etc.) could be used to display the reference. Because the user may only be able to draw on one of the screens (e.g., the screen displaying the canvas), the other screen may remain free to be used to activate other drawing tools. For example, the pen could act as a color picker on the reference screen.

Figure 2B:
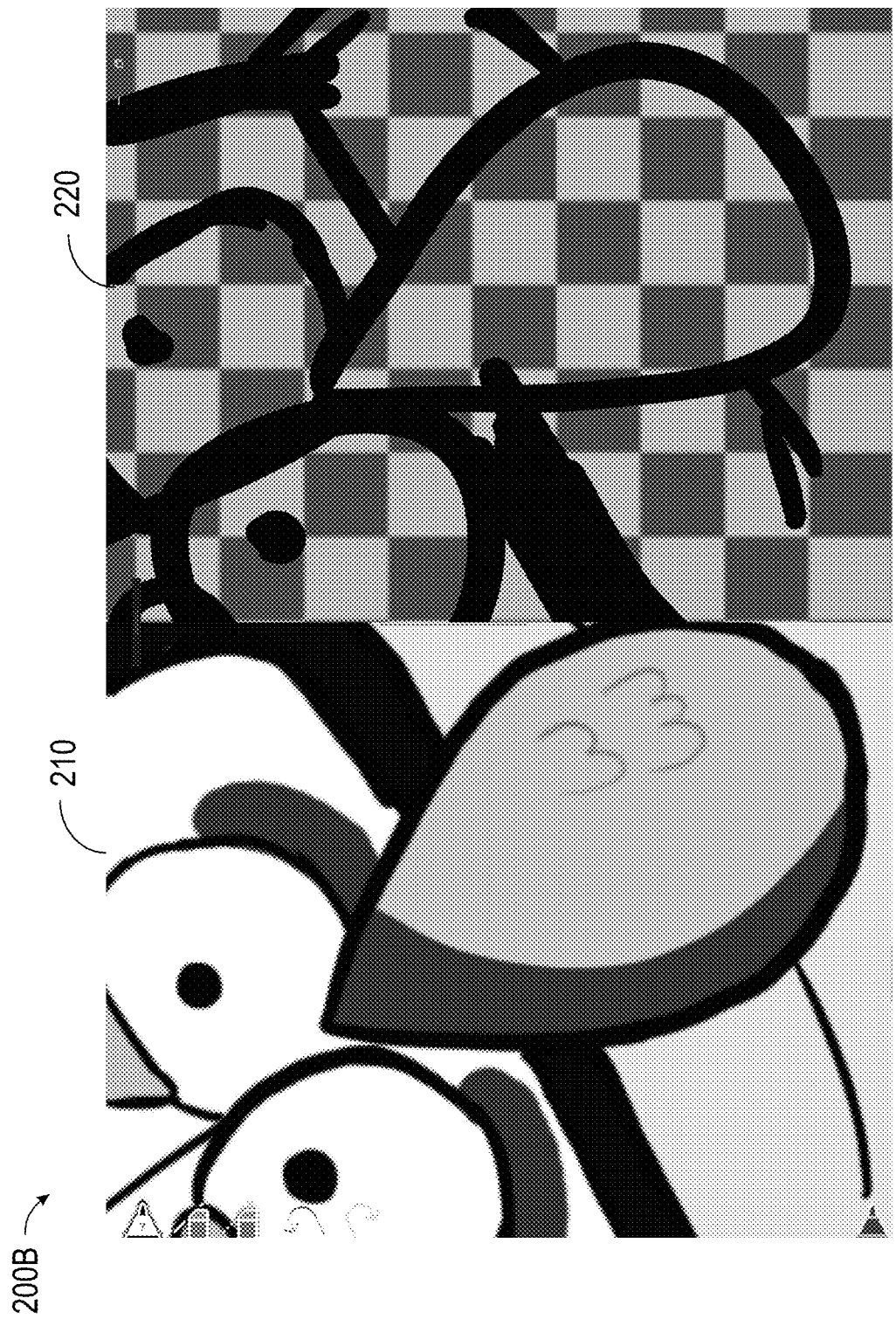

FIG. 2B depicts an example GUI screen 200B where a zoom into the image of screen 210 of GUI 200A resulted in a similar zoom into the image of screen 220. This may be done by calculating the absolute transform applied to the view on one screen (e.g., expressed in the form of a transformation matrix) and applying the same absolute transform to the view on the second screen, while keeping in mind any additional transformation (e.g., scaling, rotation, etc.) that may need to be performed based on screen sizes, screen positions, device form factors, and the like. In this manner, the user can easily use one screen as a reference point while drawing in the second screen.

Figure 3:
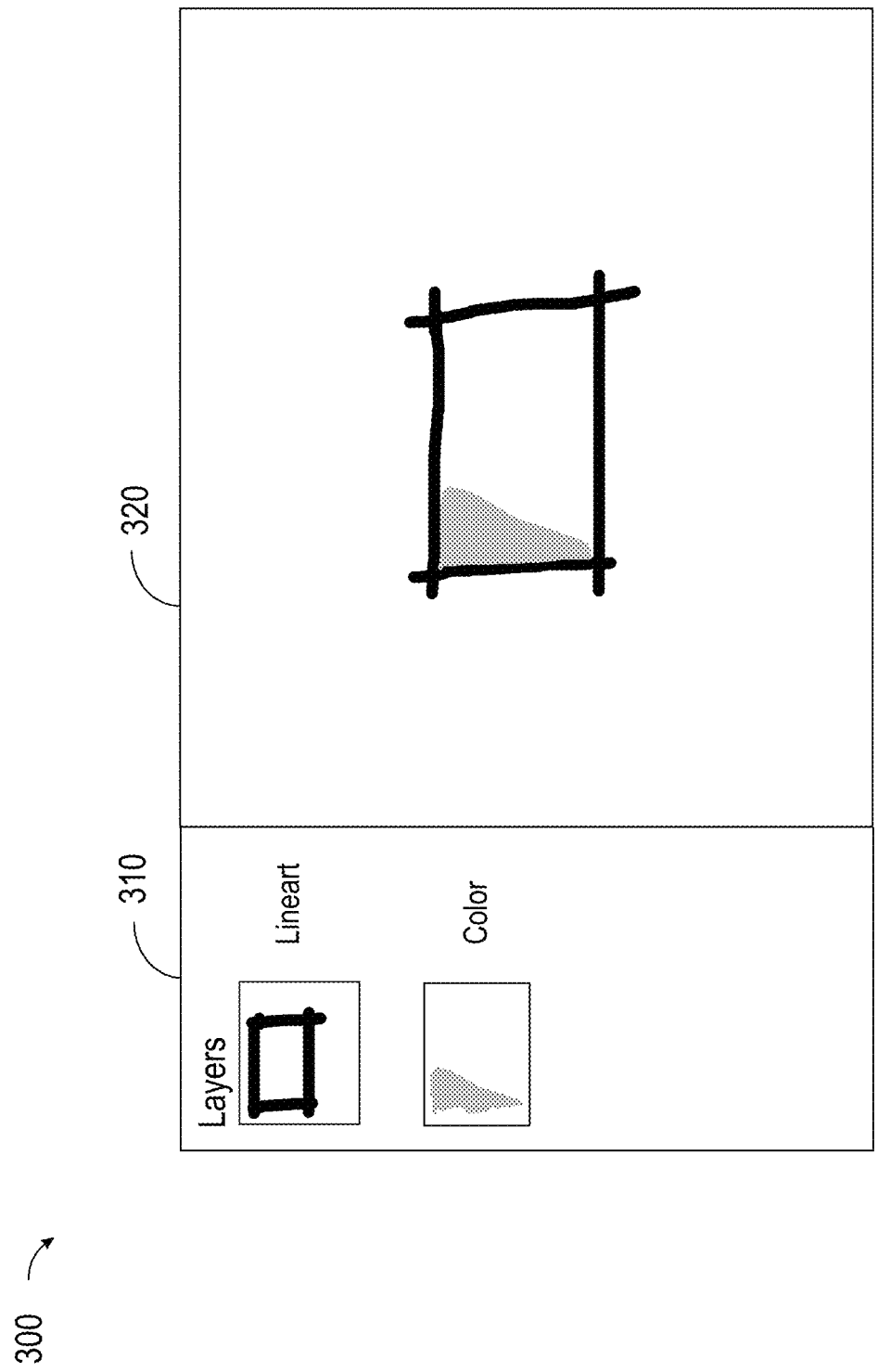
FIG. 3 depicts an example graphical user interface screen for an application providing optimized coloring for digital drawings.

FIG. 3 depicts an example GUI screen 300 for an application providing optimized coloring for digital drawings. In one implementation, to differentiate between line art and coloring, different layers may be used in the canvas. For example, as shown in pane 310, drawing element 320 may be drawn in a layer named Lineart, while coloring is done in a layer referred to as color. This may be done by first creating a layer for creating line art and then creating a next layer in which coloring is done. The different layers may enable the application to identify boundaries to which coloring should be contained. As a result, when the user begins to color in the color layer, the application may identify the area within which coloring begins and ignore any portions of a stroke that fall outside that area. For example, if after creating the color layer, the user begins coloring inside the drawing element 320, any portion of a stroke that moves outside the drawing element 320 may be ignored.

In an implementation, this optimized coloring feature may be an option that can be disabled and/or enabled by the user based on the user's needs. When enabled, the application may capture the user input before it is rendered. In Windows® applications, this may be done by using the CoreWetStrokeUpdateSource class to listen for wet ink data. As the user input (e.g., digital pen) moves, the application may detect whether the stroke being drawn intersects any of the existing strokes in the layers that contain the line art for the drawing, and in that case, may trim the stroke being drawn so that it does not leave the bounds of the current area. This may enable users to define areas to be colored (e.g., pseudo masks) easily by drawing their contour in an upper layer, and then coloring them with precision, while providing the option to leave any portions uncolored. In an example, the application may detect when two neighboring strokes are close and consider them joined, thus preventing ink to spill (extend) from the small gap between them. While this feature could help any user to color faster and more accurately, it could be a particularly useful technical solution for users with low psychomotor skills or those suffering tremors, such as small kids or people diagnosed with Parkinson's disease.

Figure 4:
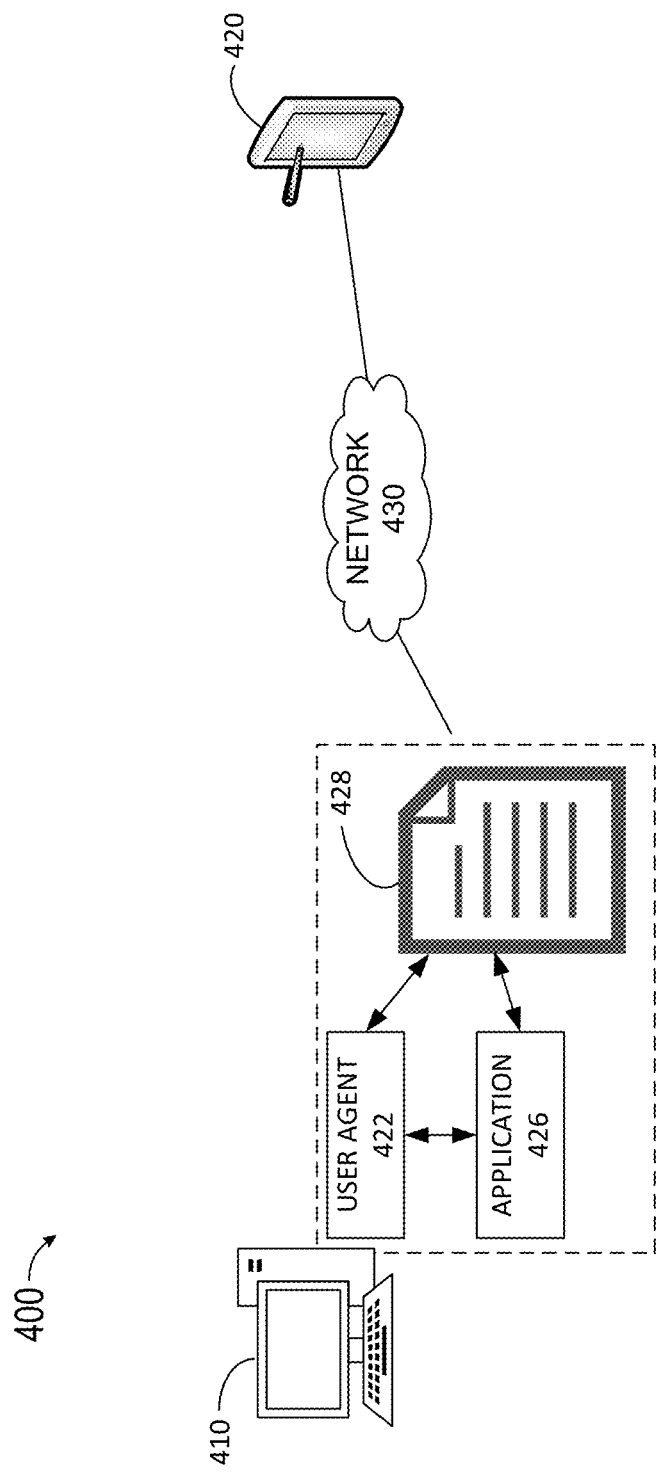
FIG. 4 depicts an example system upon which aspects of this disclosure may be implemented.

FIG. 4 depicts an example system 400, upon which aspects of this disclosure may be implemented. The system 400 may include a client computing device 410 which may be connected to and/or in communications with a second client computing device 420. Client devices 410 and 420 may be connected via a network 430. The network 430 may be a wired or wireless communications network(s) or a combination of wired and wireless networks that connect one or more elements of the system 400. Each of the client devices 410 and 420 may be a personal or handheld computing device having or being connected to input/output elements. Examples of suitable client devices include but are not limited to personal computers, desktop computers, laptop computers, mobile telephones; smart phones; tablets; phablets; smart watches; wearable computers; gaming devices/computers; televisions; and the like. The internal hardware structure of a client device is discussed in greater detail in regard to FIGS. 6 and 7.

The client device 410 may include or have access to one or more application(s) 426. Each application 426 may be a computer program executed on the client device that configures the device to be responsive to user input to allow a user to interactively view, generate and/or edit a digital drawing 428. The application 426 may process the digital drawing 428, in response to user input through an input device, to create and/or modify the content of the digital drawing, by displaying or otherwise presenting display data, such as a graphical user interface which includes the content of the digital drawing to the user. Examples of suitable applications include digital drawing applications, photo processing applications, and painting applications.

In some examples, applications used to create, modify and/or view content of a drawing may be online applications that are run on a server and provided to the client device via an online service. In one implementation, web applications may communicate via the network 430 with a user agent 422, such as a browser, executing on the client device 410. The user agent 422 may provide a user interface that allows the user to interact with application content and digital drawings stored in a cloud storage environment. The user interface may be displayed on a display device of the client device 410 by utilizing for example the user agent 422. In some examples, the user agent 422 may be a dedicated client application that provides a user interface and access to digital drawings stored in a cloud datastore. In other examples, applications used to create, modify and/or view content of a digital drawing may be local applications such as the applications 426 that are stored and executed on the client device 410, and provide a user interface that allows the user to interact with application content and digital drawing 428.

In one implementation, the application 426 may provide an option to launch a second instance of the application (e.g., a remote drawing palette) in another device such as the client device 420. Upon receiving a request to launch a second instance of the application, the client device 410 may scan the environment for nearby client devices. This may be achieved by utilizing an OS API (e.g., Project Rome API), network multicast or short-range communication capabilities (e.g., Bluetooth). Once one or more devices that are available and can be connected to the client device 410 are identified, the application may present a list of those devices in a UI element, thus enabling the user to select one of the identified devices for launching the second instance.

In one implementation, the second instance may be launched via remote protocol activation. In such a case, the URI used to launch the second instance may contain one or more parameters indicating that the second instance is a remote drawing palette instance. The URI may also include other parameters such as the network address or the name of the client device running the primary instance of the application (client device 410). In an alternative implementation, the application may be launched in the second device by utilizing a QR code. For example, the QR code may be displayed on the client device running the primary instance (e.g., client device 410) for scanning by the second device. In another configuration, a text string may be provided in the primary application for inputting into the second device. Other methods of launching the second instance in the second client device are also contemplated.

In one implementation, upon receiving the request, the second client device (client device 420) automatically opens an instance of the application 426. Alternatively, a message may be displayed on the second device requesting the user to open the application 426. If a copy of the application is not available on the client device 420, the user may be provided an option to download the application. Alternatively, an online version of the application may be provided on the second device.

Once the application 426 is opened on or accessed from the second client device, the application may automatically load the UI screen displayed on the first client device 410. This may be achieved by first establishing a connection with the application 426 running on the first client device 410. The connection may be established via raw network sockets, wireless radio (e.g., WiFi direct, Bluetooth, etc.), or via an OS API (e.g., project Rome). In an example, the UI of the second instance of the application may maintain the states from the primary instance (e.g., same type of pen and color selected, etc.). In one implementation, even if the primary instance does not display any menus (e.g., the user has closed the menus and maximized the size of the canvas), the second instance may display all the menus. This may allow the user to utilize the menus from the secondary instance while making use of a larger size canvas on the primary application. In one example, the secondary instance may not display the canvas to preserver space. In another example, the secondary instance may display a reference screen and/or different menus of the application, while the primary instance displays the canvas.

In an implementation, once the connection is active, the first client device 410 may display an indication that a connection has been established and offer an option to pair a specific digital pen with the second device. In an example, the user may utilize the digital pen to provide an input by for example tapping with the pen in a particular area of the UI displayed on the second device. Upon receiving an input from the digital pen, the application may obtain an ID associated with the digital pen, store the ID, and store an indication in memory that the pen corresponds to the specific device. This may enable the two instances of the application to associate the pen with the second device. Identifying the pen also enables the application to provide customized uses for the pen. For example, if the pen is later utilized to send a command for changing the ink color, the change in color may only be applied to that pen.

Once the connection between the primary and secondary instances of the application is successfully established, when the user interacts with the second device, the relevant command may be serialized, transmitted to the primary device, and executed within the primary instance of the application. This may enable the second device to be used as an alternative input device. Thus, the UIs presented in the two devices may be used in coordination to provide an efficient and convenient process of creating digital drawings. For example, as discussed above, menu options may be closed in the UI presented in the first device to enlarge the canvas, while they are kept open in the second device to provide any necessary inputs. Alternatively, the second device may be used to display a reference image. In an implementation, in addition to using input/output mechanisms provided by the first device, alternative input mechanisms such as an accelerometer, a camera and the like that are available via the second device may be utilized to provide input to the application.

An alternative implementation may include one client device that is connected to one or more additional display screens (e.g., additional monitors, TV, etc.). In such an implementation, the application 426 may detect that there are more than one display screens connected to the client device 410. This may be done by for example using the OS APIs. Once additional display screens are identified, the application may add itself to the list of potentials targets where the remote drawing palette could be opened. Once selected, it may launch the second instance of the application in the same client device. The two instances may communicate using any allowed inter-process communication tool or OS contract. The applications may use OS APIs to determine the sizes and capabilities of each screen and show each window in the most appropriate manner.

Figure 5:
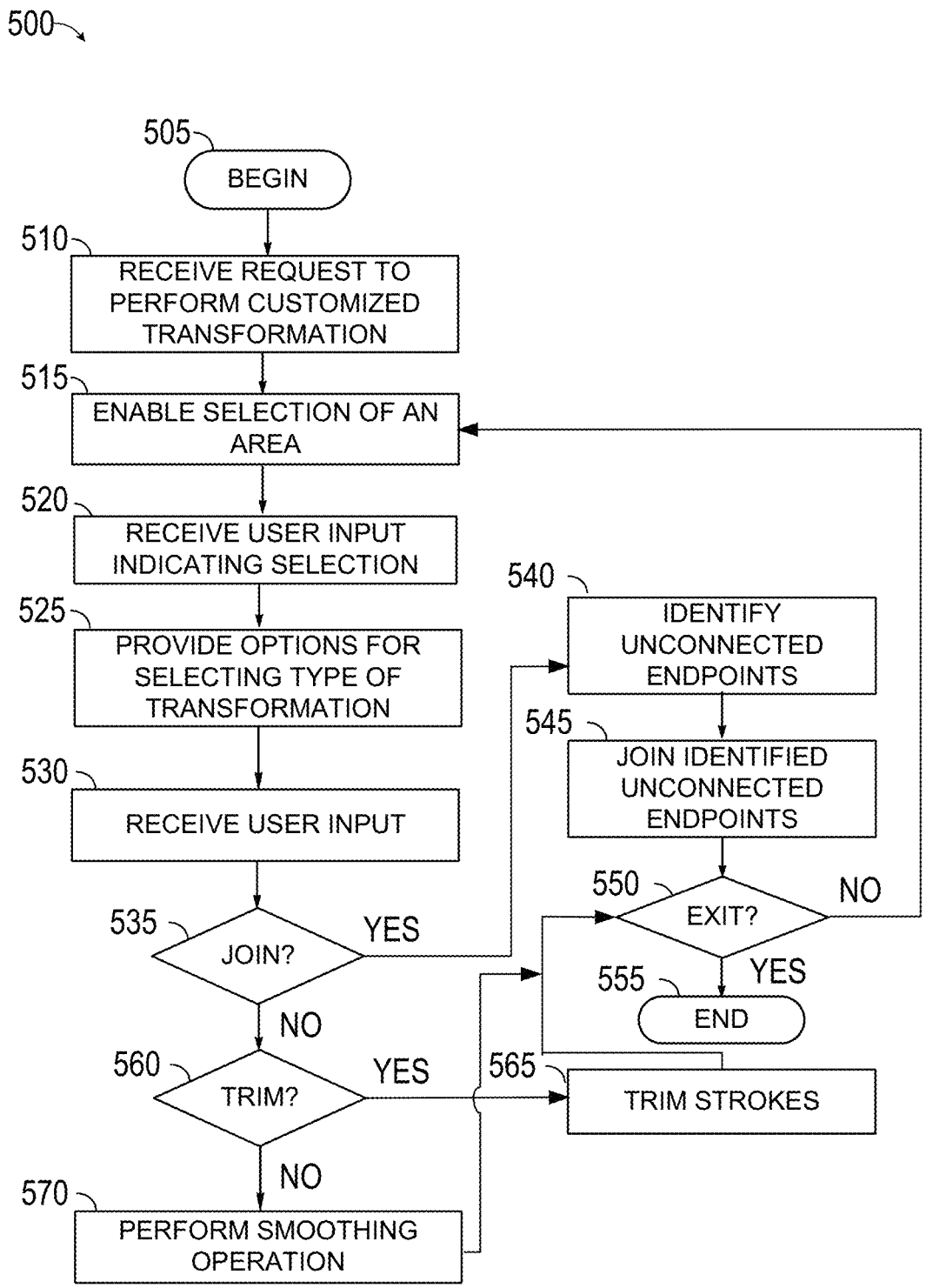
FIG. 5 is a flow diagram depicting an example method for providing customized transformations of a selected area in a digital drawing.

FIG. 5 is a flow diagram depicting an exemplary method 500 for providing customized transformations of a selected area in a digital drawing. The method 500 may begin, at 505, and proceed to receive a request for performing a customized transformation, at 510. The request may be received via a UI element of an application or service that offers creation or editing digital diagrams/drawings. For example, the request may be received upon receiving user input indicating selection of a menu option such as a lasso tool. Upon receiving the request, method 500 may proceed to enable selection of an area of the digital drawing displayed in the UI, at 515. This may be achieved, in one implementation, by darkening the content portion (e.g., the canvas where the user can draw) of the UI and enabling the user to select an area of the content portion. Other mechanisms for enabling selection of a particular area of the drawing may also be employed. In an example, to visually differentiate the selected area from the remainder of the drawing, the selected area may be displayed with a white background, while the remainder of the drawing is displayed with a dark background.

Once the UI enables selection of an area, method 500 may proceed to receive user input indicative of selecting an area, at 520. In an example, this is performed via a drag and drop operation that selects a portion of the drawing. In addition to enabling selection of an area on which customized transformation are to be performed, method 500 may also provide options for selecting the type of transformation desired, at 525. This may be achieved by displaying a number of selectable UI elements, each for one or more types of transformations. In an example, the selectable UI elements may be UI menu options. For example, a separate UI menu option may be displayed for joining unconnected lines, another UI menu option may be presented for trimming extended lines, and yet another UI menu option may be provided for smoothing lines. In an example, one or more menu options may be provided that combine one or more customized transformations. For example, a menu option may be provided for automatically performing customized transformations. This may involve the use of one or more ML models that determine the types of transformations needed and automatically apply them.

After providing the options for selecting a type of transformation, method 500 may proceed to receive user input indicative of the type of transformation desired, at 530. Once the user input is received, method 500 may determine, at 535, if the selected transformation involves joining unconnected lines. When it is determined that the desired transformation is for joining unconnected lines, method 500 may proceed to identify unconnected endpoints of lines, at 540. This may be done by examining vector information available from the selected area of the drawing to identify stroke endpoints in the selected area. If two stroke endpoints are within a predetermined distance from each other, then those endpoints may be identified as an unconnected endpoint pair.

Once unconnected endpoints are identified within the selected area, method 500 may proceed to join them, at 545. This may be done by drawing a straight line from one identified unconnected endpoint to the another in a pair of identified unconnected endpoints to join them. In one implementation, this involves calculating the average of the position of the identified endpoints and moving all the endpoints to those coordinates. Once the unconnected endpoints are joined, method 500 may determine, at 550, if it should exit the operation. This may be achieved, by for example receiving an indication from the user that the customized transformation operation is complete. For example, the user may close the lasso tool menu option to indicate completion of the operation. In an alternative implementation, once one transformation operation is complete, method 500 may automatically exit.

When it is determined, at 550, that the operation is complete, method 500 may proceed to exit, at 555. If, however, it is determined, at 550, that the operation should not exit, method 500 may return to step 515 to enable selection of an area for performing another customized transformation.

Referring back to step 535, when it is determined that the selected transformation is not a join operation, method 500 may proceed to determine, at 560 whether the selected transformation operation is a trimming operation. When it is determined that a trimming operation has been selected, method 500 may proceed to trim lines within the selected area that extend beyond a point of intersection, at 565. This may be done by identifying two or more vector strokes in the selected area that have intersected but include portions that go beyond the point of intersection. If those strokes have endpoints that are located within the selected area, then they may be identified as having undesired extensions that should be trimmed. The undesired extensions may then be removed by deleting the part of each stroke that goes from the point of intersection to the identified endpoint.

When it is determined, at 560, that the selected operation is not a trimming operation, method 500 may proceed to perform a smoothing operation. This is because, in an implementation that offers the three types of transformations (joining, trimming, smoothing), once it is determined that the selected operation is not the first two, it can be assumed that the selected transformation operation is the third choice. Performing a smoothing operation may be done by first identifying the endpoints where any drawing lines intersect with the selected area and/or if any points of intersection between multiple strokes. The identified points may then be used as endpoints for drawing a straight line from one endpoint to a next closes endpoint. In an implementation, this may involve pairing the identified endpoints based on their distance from each other and/or other factors. Once the trimming operation is complete, method 500 may proceed to step 550 to determine if it should exit the transformation operation, as discussed above.

The process of launching additional instances of the application may be applied to multiple devices and screens. This may be particularly beneficial in a collaboration scenario where each user can have their own controls at hand, thus enabling them to simultaneously work on the same digital drawing. In an example, each user's commands can be associated with a specific pen in the main device.

Thus, in an implementation, technical solutions provided herein utilize a lasso tool as an input mechanism for providing a variety of features that process existing vector strokes in a digital drawing in an automatic manner to provide optimizing transformations. The transformations can be explicitly requested by the user or deduced using artificial intelligence or ML algorithms (e.g. a small neural network running in the GPU of the device).

The technical solutions also provide optimized coloring by utilizing information present in other layers of the drawing to predict the bounds of the area the user desires to color, and preemptively trimming any stroke that accidentally exits that area. ML models (e.g. a small neural network running in the GPU of the device) may be used to better predict which strokes are bounds of the drawing and which are not, or to understand which gaps between strokes are accidental.

Furthermore, the technical solutions provide an ability to launch an additional instance of a drawing application in a second device or second display screen. This may enable displaying an alternate UI which is aware that it is a secondary/remote instance, and as such forwards all the user commands to the main device. The main device may transmit the relevant information to all the devices so they can update their UI as appropriate, thus providing a secondary means of providing input and utilizing additional screen space. Another feature provided by the technical solutions offered herein includes displaying two screens where one displays a reference picture and the other displays a canvas where the user can draw. The screens may be displayed side by side, while their states are synchronized.

The technical solutions discussed above may be particularly advantageous for use on devices with multiple and/or foldable screens (e.g. Courier-like notebook devices, PCs attached to a digitizer screens, tablets connected to a second screen, or devices with a "desk" form factor).

Figure 6:
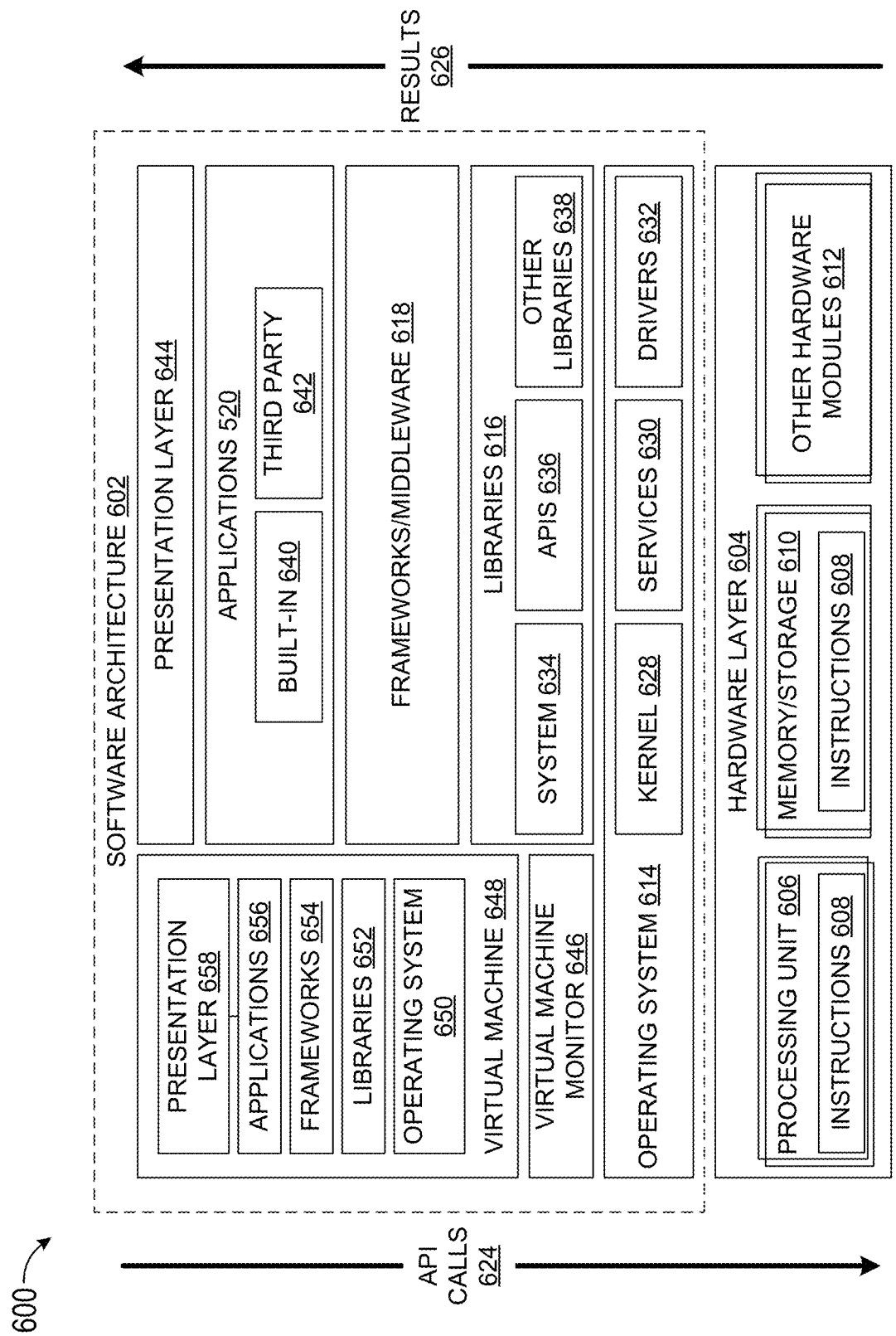
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture and it will be appreciated that many other architectures may be implemented to facilitate the functionality described herein. The software architecture 602 may execute on hardware such as client devices, native application provider, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 608 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 624. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 620 and/or third-party applications 622. Examples of built-in applications 620 may include, but are not limited to, a contacts application, a browser application, a location application, a media application, a messaging application, and/or a game application. Third-party applications 622 may include any applications developed by an entity other than the vendor of the particular system. The applications 620 may use functions available via OS 614, libraries 616, frameworks 618, and presentation layer 624 to create user interfaces to interact with users.

Some software architectures use virtual machines, as illustrated by a virtual machine 628. The virtual machine 628 provides an execution environment where applications/modules can execute as if they were executing on a hardware machine (such as the machine 600 of FIG. 6, for example). The virtual machine 628 may be hosted by a host OS (for example, OS 614) or hypervisor, and may have a virtual machine monitor 626 which manages operation of the virtual machine 628 and interoperation with the host operating system. A software architecture, which may be different from software architecture 602 outside of the virtual machine, executes within the virtual machine 628 such as an OS 650, libraries 652, frameworks 654, applications 656, and/or a presentation layer 658.

Figure 7:
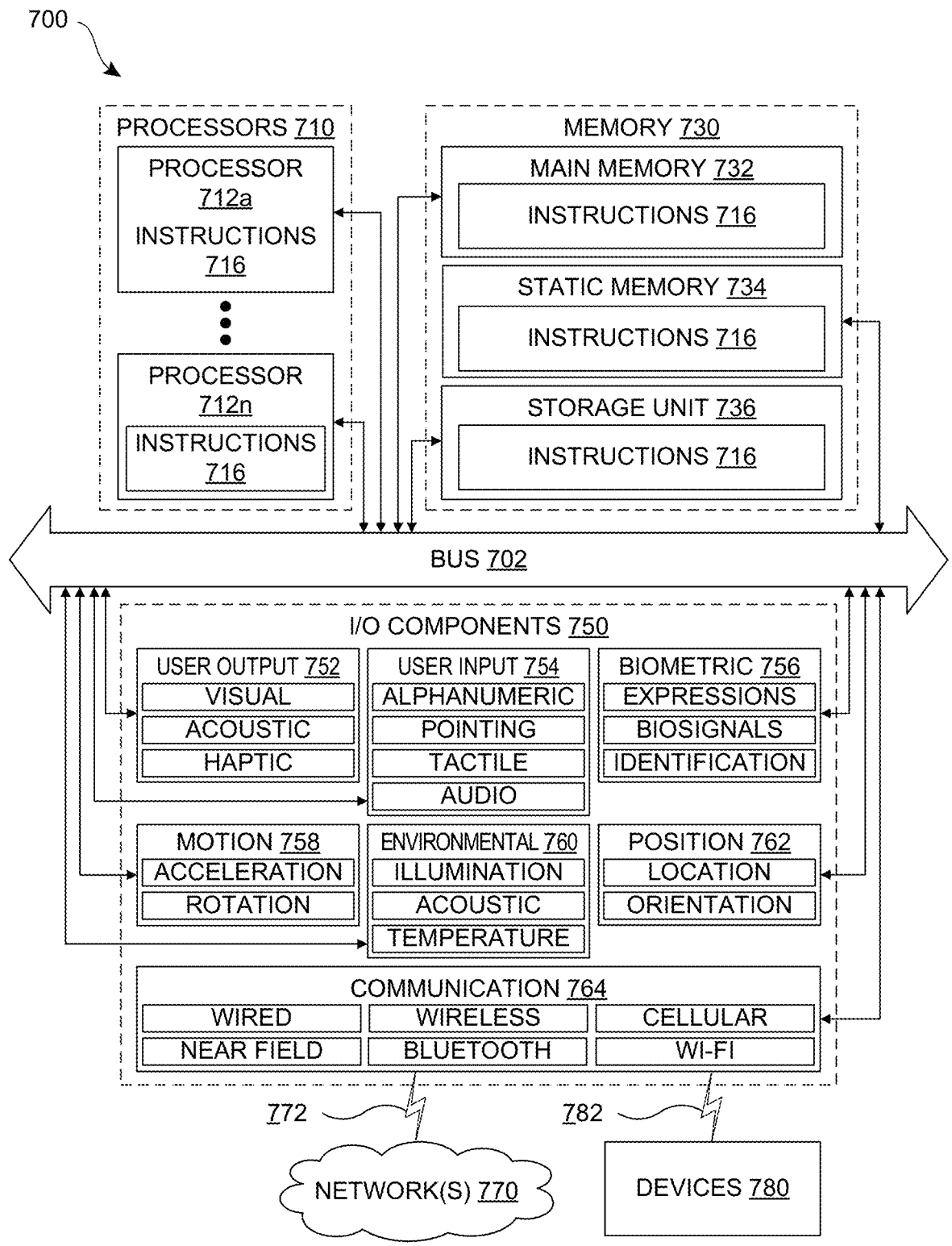
FIG. 7 is a block diagram illustrating components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-5) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are platform-independent, meaning that the techniques may be implemented on a variety of computing platforms having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A device comprising:
a processor; and
a memory in communication with the processor, the memory comprising executable instructions that, when executed by the processor, cause the device to perform functions of:
receiving a request to perform a transformation operation on a digital drawing to optimize the digital drawing;
providing a tool for selecting an area of the digital drawing to perform the transformation operation on;
receiving a selection of the selected area of the digital drawing;
transforming the selected area of the digital drawing to optimize the digital drawing; and
displaying the transformed area of the digital drawing.

Item 2. The device of item 1, wherein transforming the selected area of the digital drawing includes at least one of joining unconnected lines, trimming lines that extend beyond a point of intersection, and smoothing lines.

Item 3. The device of items 1 or 2, wherein joining unconnected lines comprises joining one or more unconnected strokes within the selected area.

Item 4. The device of any of the preceding items, wherein trimming lines that extend beyond a point of intersection comprises deleting a section of a first stroke that starts from a point of intersection with a second strokes and ends in the selected area and removing the detected section.

Item 5. The device of any of the preceding items, wherein smoothing lines comprises:
identifying at least one of points of intersection between one or more strokes in the selected area and a border of the selected area and points of intersection between two or more strokes; and
drawing a line from one identified point to another.

Item 6. The device of any of the preceding items, wherein the executable instructions when executed by the processor further cause the device to perform function of receiving an input identifying a type of transformation desired to be applied to the selected area.

Item 7. The device of any of the preceding items, wherein the executable instructions when executed by the processor further cause the device to perform function of enabling selection of an area of the digital drawing as the selected area.

Item 8. The device of any of the preceding items, wherein the tool is a lasso tool.

Item 9. The device of any of the preceding items, wherein the digital drawing is displayed in a first user interface screen and the executable instructions when executed by the processor further cause the device to perform function of receiving a request to display a second user interface side by side with the first user interface screen.

Item 10. The device of any of the preceding items, wherein the second user interface screen displays a reference drawing and a user interaction with the first user interface causes the same user interaction to be implemented in the second user interface and vice versa.

Item 11. A first device comprising:
a processor; and
a memory in communication with the processor, the memory comprising executable instructions that, when executed by the processor, cause the device to perform functions of:
displaying a first user interface of a first instance of a digital drawing application;
receiving a request for launching a second instance of the digital drawing application in a second device;
communicating with the second device to launch the second instance in the second device;
enabling the second device to display a second user interface in the second instance that corresponds with the first user interface;
receiving an input from the second instance in the second device;
processing the input in the first instance.

Item 12. The first device of item 11, wherein the first user interface displays a canvas for drawing.

Item 13. The first device of items 11 or 12, wherein the second user interface displays user interface elements providing features for the digital drawing application.

Item 14. The first device of any of items 11-13, wherein the second user interface displays a reference drawing.

Item 15. The first device of any of items 11-14, wherein upon receiving a user interaction with the first user interface, the same user interaction may be implemented in the second user interface and vice versa.

Item 16. A method for providing optimized coloring for a digital drawing comprising:
receiving an input for a digital drawing;
identifying the input as related to coloring a portion of the digital drawing;
identifying one or more boundary lines for the portion of the digital drawing;
determining if the input includes a stroke that extends outside at least one of the one or more boundary lines; and
upon determining that the input includes the stroke that extends outside the at least one of the one or more boundary lines, removing a section of the stroke that extends outside the at least one of the one or more boundary lines.

Item 17. The method of item 16, wherein the portion is created in a first layer of the digital drawing and the coloring is done in a second layer of the digital drawing.

Item 18. The method of items 16 or 17, wherein identifying the one or more boundary lines of the portion are done based at least in part on identifying the first layer and the second layer.

Item 19. The method of any of items 16-18, wherein the input is captured before it is rendered.

Item 20. The method of any of items 16-19, further comprising:
detecting when two neighboring strokes in the digital drawing are within a predetermined distance from each other; and
considering the two neighboring strokes as joined to prevent coloring from extending outside a gap between the two neighboring strokes.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

What is claimed is:

1. A device comprising:

a processor; and a memory in communication with the processor, the memory comprising executable instructions that, when executed by the processor, cause the device to perform functions of:

receiving a request to perform a transformation operation on a digital drawing to optimize the digital drawing;

providing a tool for selecting an area of the digital drawing to perform the transformation operation on;

receiving a selection of the selected area of the digital drawing;

providing data about the selected area of the digital drawing to a machine- learning (ML) model to automatically determine a type of transformation needed for the selected area of the digital drawing;

receiving the type of transformation needed as an output from the ML model, wherein the type of transformation needed includes smoothing a first line;

performing the type of transformation needed on the selected area of the digital drawing to optimize the digital drawing, wherein smoothing the first line includes:

identifying a first point of intersection between a first point of the first line in the selected area and a border of the selected area;

identifying a second point of intersection between a second point of the first line and the border or between a third point of the first line and a second line; and drawing a third line from the first point to the second point; and displaying the transformed area of the digital drawing.

2. The device of claim 1, wherein transforming the selected area of the digital drawing includes at least one of joining unconnected lines, trimming lines that extend beyond a point of intersection, and smoothing lines.

3. The device of claim 2, wherein joining unconnected lines comprises joining one or more unconnected strokes within the selected area.

4. The device of claim 2, wherein trimming lines that extend beyond a point of intersection comprises deleting a section of a first stroke that starts from a point of intersection with a second stroke and ends in the selected area, and removing the detected section.

5. The device of claim 1, wherein the executable instructions when executed by the processor further cause the device to perform function of enabling selection of an area of the digital drawing as the selected area.

6. The device of claim 1, wherein the tool is a lasso tool.

7. The device of claim 1, wherein the digital drawing is displayed in a first user interface screen and the executable instructions when executed by the processor further cause the device to perform function of receiving a request to display a second user interface side by side with the first user interface screen.

8. The device of claim 7, wherein the second user interface screen displays a reference drawing and a user interaction with the first user interface causes the same user interaction to be implemented in the second user interface and vice versa.

* * * * *